United States Patent
Nysen

(10) Patent No.: US 6,633,226 B1
(45) Date of Patent: *Oct. 14, 2003

(54) FREQUENCY HOPPING SPREAD SPECTRUM PASSIVE ACOUSTIC WAVE IDENTIFICATION DEVICE

(75) Inventor: Paul A. Nysen, Sunnyvale, CA (US)

(73) Assignee: X-Cyte, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/248,022

(22) Filed: Feb. 10, 1999

Related U.S. Application Data

(63) Continuation-in-part of application No. 08/914,282, filed on Aug. 18, 1997.

(51) Int. Cl.⁷ .................................................. H04Q 5/22
(52) U.S. Cl. ..................................... 340/10.1; 340/10.3
(58) Field of Search ......................... 340/10.1, 10.3, 340/10.4; 342/42, 41; 370/321, 315, 310; 455/133, 14, 55.1; 375/131

(56) References Cited

U.S. PATENT DOCUMENTS

| | | |
|---|---|---|
| 3,273,146 A | 9/1966 | Hurwitz, Jr. |
| 3,706,094 A | 12/1972 | Cole et al. |
| 3,755,803 A | 8/1973 | Cole et al. |
| 3,898,592 A | 8/1975 | Solie |
| 4,058,217 A | 11/1977 | Vaughan et al. |
| 4,059,831 A | 11/1977 | Epstein |
| 4,484,160 A | 11/1984 | Riha |
| 4,604,623 A | 8/1986 | Skeie |
| 4,605,929 A | 8/1986 | Skeie |
| 4,620,191 A | 10/1986 | Skeie |
| 4,623,890 A | 11/1986 | Nysen |
| 4,625,207 A | 11/1986 | Skeie |
| 4,625,208 A | 11/1986 | Skeie |
| 4,703,327 A | 10/1987 | Rossetti et al. |
| 4,724,443 A | 2/1988 | Nysen |
| 4,725,841 A | 2/1988 | Nysen et al. |
| 4,734,698 A | 3/1988 | Nysen et al. |
| 4,737,789 A | 4/1988 | Nysen |
| 4,737,790 A | 4/1988 | Skeie et al. |
| 4,739,328 A | 4/1988 | Koelle et al. |
| 4,888,591 A | 12/1989 | Landt et al. |
| 4,951,057 A | 8/1990 | Nagel |
| 5,095,240 A | 3/1992 | Nysen et al. |
| 5,182,570 A | 1/1993 | Nysen et al. |
| 5,377,222 A * | 12/1994 | Sanderford, Jr. ............ 375/131 |
| 5,448,242 A * | 9/1995 | Sharpe et al. ................. 342/42 |
| 5,507,035 A * | 4/1996 | Bantz et al. ................. 455/133 |
| 5,841,766 A * | 11/1998 | Dent et al. ................... 370/321 |
| 6,114,971 A * | 9/2000 | Nysen ........................ 340/10.3 |

* cited by examiner

*Primary Examiner*—Michael Horabik
*Assistant Examiner*—William Bangachon
(74) *Attorney, Agent, or Firm*—Milde & Hoffberg LLP

(57) ABSTRACT

A system and method for interrogating a passive acoustic transponder, producing a transponder signal having characteristic set of signal perturbations in response to an interrogation signal, comprising a signal generator, producing an interrogation signal having a plurality of differing frequencies; a receiver, for receiving the transponder signal; a mixer, for mixing the transponder signal with a signal corresponding to the interrogation signal, to produce a mixed output; an integrator, integrating the mixed output to define an integrated phase-amplitude response of the received transponder signal; and an analyzer, receiving a plurality of integrated phase-amplitude responses corresponding to the plurality of differing frequencies, for determining the characteristic set of signal perturbations of the passive acoustic transponder.

42 Claims, 7 Drawing Sheets

FREQUENCY HOPPING SPREAD SPECTRUM PASSIVE ACOUSTIC WAVE IDENTIFICATION DEVICE

The present application is a Continuation-in-Part of U.S. patent application Ser. No. 08/914,282, filed Aug. 18, 1997, the entirety of which is expressly incorporated herein by reference.

FIELD OF THE INVENTION

The present invention relates to method and apparatus for interrogating a passive acoustic identification device (transponder) using a frequency hopping spread spectrum interrogation signal, and more particularly to a system and method for analyzing a passive acoustic wave identification device response to a frequency and time discontinuous interrogation signal.

BACKGROUND OF THE INVENTION

A known radio frequency passive acoustic transponder system produces individualized responses to an interrogation signal. The code space for these devices may be, for example, $2^{16}$ codes, or more, allowing a large number of transponders to be produced without code reuse. These devices provide a piezoelectric substrate on which an aluminum pattern is formed, for example by a typical microphotolithography process, with a minimum feature size of, for example, one micron.

The aforementioned transponder devices include a surface acoustic wave device, in which an identification code is provided as a characteristic time-domain delay pattern in a retransmitted signal, in a system which generally requires that the signal emitted from an exciting antenna be non-stationary with respect to a signal received from the tag. This ensures that the reflected signal pattern is distinguished from the emitted signal, and can be analyzed in a plurality of states. This analysis reveals the various delay components within the device. In such a device, received RF energy is transduced onto a piezoelectric substrate as an acoustic wave by means of an interdigital electrode system, from whence it travels through the substrate, interacting with reflecting, delay or resonant/frequency selective elements in the path of the wave. A portion of the acoustic wave is ultimately received by an interdigital electrode system, which may be the same or different than the launch transducer, and retransmitted. These devices do not require a semiconductor memory nor external electrical energy storage system, e.g., battery or capacitor, to operate. The propagation velocity of an acoustic wave in a surface acoustic wave device is slow as compared to the free space propagation velocity of a radio wave. Thus, the time for transmission between the radio frequency interrogation system and the transponder is typically short as compared to the acoustic delay of the substrate. This allows the rate of the interrogation frequency change to be based primarily on the delay characteristics within the transponder, without requiring measurements of the distance between the transponder and the interrogation system antenna.

The interrogation frequency is controlled to change sufficiently from the return or "backscatter" signal from the transponder, so that a return signal having a minimum delay may be distinguished from the interrogation frequency, and so that all of the relevant delays are unambiguously received for analysis. The interrogation frequency thus should not return to the same frequency within a minimum time-period. Generally, such systems are interrogated with a pulse transmitter or chirp frequency system.

Systems for interrogating a passive transponder employing acoustic wave devices, carrying amplitude and/or phase-encoded information are disclosed in, for example, U.S. Pat. Nos. 4,059,831; 4,484,160; 4,604,623; 4,605,929; 4,620,191; 4,623,890; 4,625,207; 4,625,208; 4,703,327; 4,724,443; 4,725,841; 4,734,698; 4,737,789; 4,737,790; 4,951,057; 5,095,240; and 5,182,570, expressly incorporated herein by reference. Other passive interrogator label systems are disclosed in the U.S. Pat. Nos. 3,273,146; 3,706,094; 3,755,803; and 4,058,217, expressly incorporated herein by reference.

Passive transponder tag interrogation systems are also known with separate receiving and transmitting antennas, which may be at the same frequency or harmonically related, and having the same or different polarization. Thus, in these systems, the transmitted and received signals may be distinguished other than by frequency. The acoustic wave is often a surface acoustic wave, although acoustic wave devices operating with various other wave types, such as bulk waves, are known.

The information code associated with and which identifies the passive transponder is built into the transponder at the time that a layer of metallization is finally defined on the substrate of piezoelectric material. This metallization also defines the antenna coupling, launch transducers, acoustic pathways and information code elements, e.g., reflectors and delay elements. Thus, the information code in this case is non-volatile and permanent. The information representing these elements is present in the return signal as a set of characteristic perturbations of the interrogation signal, such as a specific complex delay pattern and attenuation characteristics. In the case of a transponder tag having launch transducers and a variable pattern of reflective elements, the number of possible codes is $N \times 2^M$ where N is the number of acoustic waves launched by the transducers and M is the number of reflective element positions for each transducer. Thus, with four launch transducers each emitting two acoustic waves, and a potential set of eight variable reflective elements in each acoustic path, the number of differently coded transducers is 2048. Therefore, for a large number of potential codes, it is necessary to provide a large number of launch transducers and/or a large number of reflective elements. However, efficiency is lost with increasing acoustic path complexity, and a large number of distinct acoustic waves reduces the signal strength of the signal encoding the information in each. Therefore, the transponder design is a tradeoff between device codespace complexity and efficiency.

The known passive acoustic transponder tag thus typically includes a multiplicity of "signal conditioning elements", i.e., delay elements, reflectors, and/or amplitude modulators, which are coupled to receive the first signal from a transponder antenna. Each signal conditioning element provides an intermediate signal having a known delay and a known amplitude modification to the acoustic wave interacting with it. Even where the signal is split into multiple portions, it is advantageous to reradiate the signal through a single antenna. Therefore, a "signal combining element" coupled to the all of the acoustic waves, which have interacted with the signal conditioning elements, is provided for combining the intermediate signals to produce the radiated transponder signal. The radiated signal is thus a complex composite of all of the signal modifications, which may occur within the transponder, modulated on the interrogation wave.

In known passive acoustic transponder systems, the transponder remains static over time, so that the encoded information is retrieved by a single interrogation cycle, representing the state of the tag, or more typically, obtained as an inherent signature of an emitted signal due to internal time delays. In order to determine a transfer function of a passive transponder device, the interrogation cycle may include measurements of excitation of the transponder at a number of different frequencies. This technique allows a frequency domain analysis, rather than a time domain analysis of an impulse response of the transponder. This is particularly important since time domain analysis requires very high time domain resolution, e.g., <100 nS, to accurately capture the characteristics of the encoding, while frequency domain analysis does not impose such stringent requirements on the analysis system.

Passive transponder encoding schemes include selective modification of interrogation signal transfer function H(s) and delay functions f(z). These functions therefore typically generate a return signal in the same band as the interrogation signal. Since the return signal is mixed with the interrogation signal, the difference between the two will generally define the information signal, along with possible interference and noise. By controlling the rate of change of the interrogation signal frequency with respect to a maximum round trip propagation delay, including internal delay, as well as possible Doppler shift, the maximum bandwidth of the demodulated signal may be controlled. Thus, the known systems seek to employ a chirp interrogation waveform which allows a relatively simple processing of limited bandwidth signals.

Typically, the interrogator transmits a first signal having a first frequency that successively assumes a plurality of incremental frequency values within a prescribed frequency range. This first frequency may, for example, be in the range of 905–925 MHz, referred to herein as the nominal 915 MHz band, a frequency band that is commonly available for unlicensed use. Of course, other bands may be used, and preferably these are bands which do not require a license, and are available worldwide for use. Of course, licensed bands and locally available bands may be used. The response of the tag to excitation at any given frequency is distinguishable from the response at other frequencies, due to the relationship of the particular frequency and fixed time delays.

Preferably, the passive acoustic wave transponder tag includes at least one element having predetermined characteristics, which assists in synchronizing the receiver and allowing for temperature compensation of the system. As the temperature changes, the piezoelectric substrate may expand and contract, altering the characteristic delays and other parameters of the tag. Variations in the transponder response due to changes in temperature thus result, in part, from the thermal expansion of the substrate material. Although propagation distances are small, an increase in temperature of only 20° C. can produce an increase in propagation time by the period of one entire cycle at a transponder frequency of about 915 MHz; correspondingly, a change of about 1° C. results in a relative phase change of about 18°.

A known transponder is constructed such that $i^{th}$ delay time $t_i=T_0+K\Delta T+\Delta V_i$, where K is a proportionality constant, $\Delta T$ is the nominal, known difference in delay time between the intermediate signals of two particular successive ones of the signal delay elements in the group, and $\Delta V_i$ is a modification factor due to inter-transponder variations, such as manufacturing variations. By measuring the quantities $\Delta T$ and $\Delta V_i$, it is possible, according to known techniques, to determine the expected delay time $t_i-T_0$ for each and every signal delay element from the known quantities K, $\Delta T$ and $\Delta V_i$. The manufacturing variations $\Delta V_i$ comprise a "mask" variation $\Delta M_i$ due to imperfections in the photolithographic mask; an "offset" variation $\Delta O_i$ which arises from the manufacturing process used to deposit the metal layer on the piezoelectric substrate; and a random variation $\Delta R_i$ which is completely unpredictable but usually neglectably small. Specific techniques are available for determining and compensating both the mask variations $\Delta M_i$ and the offset variations $\Delta O_i$.

The known chirp interrogation system for interrogating surface acoustic wave transponder system provides a number of advantages, including high signal-to-noise performance. Further, the output of the signal mixer—namely, the signal which contains the instantaneous difference frequencies of the interrogating chirp signal and the transponder reply signal, typically fall in the range below 3000 Hz, and thus may be transmitted over inexpensive, shielded, audio-grade twisted-pair wires. Furthermore, since signals of this type are not greatly attenuated or dispersed when transmitted over long distances, the signal processor may be located at a position quite remote from the signal mixer, or provided as a central processing site for multiple interrogator antennae.

Another known type of interrogation system employs impulse excitation. These systems require broadband transponder signal analysis, and thus cannot typically employ audio frequency analysis systems. This impulse excitation interrogation system does not seek to analyze the response of fixed elements within the passive transponder to a plurality of different excitation challenges.

A known surface acoustic wave passive interrogator label system, as described, for example, in U.S. Pat. Nos. 4,734,698; 4,737,790; 4,703,327; and 4,951,057, expressly incorporated herein by reference, includes an interrogator having a voltage controlled oscillator which produces a first radio frequency signal determined by a control voltage. This first signal is amplified by a power amplifier and applied to an antenna for transmission to a remote transponder. As is known, the voltage controlled oscillator may be replaced with other oscillator types.

The first signal is received by an antenna of the remote transponder and passed to a signal transforming element, which converts the first (interrogation) signal into a second (reply) signal, encoded with a characterizing information pattern. The information pattern is encoded by a series of elements having characteristic delay periods $T_0$ and $\Delta T_1$, $\Delta T_2, \ldots \Delta T_N$.

Two common types of systems exist. In a first, the delay periods correspond to physical delays in the propagation of the acoustic signal. After passing each successive delay, a portion of the signal $I_0, I_1, I_2 \ldots I_N$ is tapped off and supplied to a summing element. The resulting signal S2, which is the sum of the intermediate signals $I_0 \ldots I_N$, is fed back to a transponder tag antenna, which may be the same or different than the antenna which received the interrogation signal, for transmission to the interrogator/receiver antenna. In a second system, the return signal is composed of sets of reflected signals, resulting from reflectors in the path of the signal which reflect portions of the acoustic wave back to the launch transducer, where they are converted back to an electrical signal and emitted by the transponder tag antenna. The second signal is passed either to the same or different antenna of the remote transponder for transmission back to the interrogator/receiver apparatus. In both cases, between the taps or reflectors, signal modification elements, such as delay pads, selectively modify the signal. This second signal carries encoded information which, at a minimum, identifies the particular transponder.

The transponder serves as a signal transforming element, which comprises N+1 signal conditioning elements and a signal combining element. The signal conditioning elements are selectively provided to impart a different response code for different transponders, and which may involve separate intermediate signals $I_0, I_1 \ldots I_N$ within the transponder. Each signal conditioning element comprises a known delay $T_i$ and a known amplitude modification $A_i$ (either attenuation or amplification). The respective delay $T_i$ and amplitude modification $A_i$ may be functions of the frequency of the received first signal, may provide a constant delay and constant amplitude modification, respectively, independent of frequency or may have differing dependency on frequency. The order of the delay and amplitude modification elements may be reversed; that is, the amplitude modification elements $A_i$ may precede the delay elements $T_i$. Amplitude modification $A_i$ can also occur within the path $T_i$. The signals are combined in a combining element which combines these intermediate signals (e.g., by addition, multiplication or the like) to form the second (reply) signal S2 and the combined signal is emitted by the transponder antenna.

The second signal is picked up by a receiving antenna of the interrogation apparatus. Both this second signal and the first signal (or respective signals derived from these two signals) are applied to a mixer (four quadrant multiplier) to produce a third signal containing frequencies which include both the sums and the differences of the frequencies contained in the first and second signals. The third signal is then low-pass filtered, digitized and passed to a digital signal processor which determines the amplitude $a_i$ and the respective phase $\phi_i$ of each frequency component $f_i$ among a set of frequency components ($f_0, f_1, f_2 \ldots$) in the filtered third signal. The filter thus distinguishes the sum and difference components, and prevents aliasing in the analog-to-digital converter. Typically, the low pass filter is set to have a narrow passband, to filter transients and reduce Gaussian noise. For example, in a known system with a frequency hopping rate of 8,000 per second, the filter has a cutoff of about 3,000 Hz. This narrow bandwidth allows a relatively slow analog to digital converter, e.g., about 10 ksps, to be employed to digitize the signal.

Each phase $\phi_i$ is determined with respect to the phase $\phi_0=0$ of the lowest frequency component $f_0$. The third signal may be intermittently supplied to the mixer by means of a switch, and indeed the signal processor may be time-division multiplexed to handle a plurality of mixed (demodulated) signals from different antennas.

The information determined by the digital signal processor is passed to a microprocessor computer system. This computer system analyzes the frequency, amplitude and phase information and makes decisions based upon this information. For example, the computer system may determine the identification number of the interrogated transponder. This I.D. number and/or other decoded information is made available at an output.

In one known interrogation system embodiment, the voltage controlled oscillator is controlled to produce a sinusoidal RF signal with a frequency that is incrementally swept in 128 equal discrete steps from 905 MHz to 925 MHz. Each frequency step is maintained for a period of 125 microseconds so that the entire frequency sweep is carried out in 16 milliseconds, with a step rate of 8 kHz. Thereafter, the frequency is dropped back to 905 MHz in a relaxation period of 0.67 milliseconds. This stepwise frequency sweep approximates a linear frequency sweep. In this embodiment, each delayed component within the reply (second) signal has a different frequency with respect to the instantaneous interrogation (first) signal.

Assuming a round-trip, radiation transmission time of $t_0$, the total round-trip times between the moment of transmission of the first signal and the moments of reply of the second signal will be to $t_0+T_0, t_0+T_1, \ldots t_0+T_N$, for the delays $T_{0N}, T \ldots, T_1$ respectively. Considering only the transponder delay $T_N$, at the time $t_R$ when the second (reply) signal is received at the antenna, the frequency of this second signal will be $\Delta f_N$ less than the instantaneous frequency of the first signal transmitted by the interrogator system antenna. Thus, if the first and second signals are mixed or "homodyned", this frequency difference $\Delta f_N$ will appear in the third signal as a beat frequency. Understandably, other beat frequencies will also result from the other delayed frequency spectra resulting from the time delays $T_0, T_1 \ldots T_{N-1}$. In the case of a "chirp" waveform, the difference between the emitted and received waveform will generally be constant, and therefore the relationship of each delayed component can be determined.

In mathematical terms, we assume that the phase of a transmitted interrogation signal is $\phi=2\pi f\tau$, where $\tau$ is the round-trip transmission time delay. For a ramped frequency $df/dt$ or f, we have: $2\pi f\tau=d\phi/dt=\omega$. $\omega$, the beat frequency, is thus determined by $\tau$ for a given ramped frequency or chirp f. In this case, the third (mixed) signal may be analyzed by determining a frequency content of the third signal, for example by applying it to sixteen bandpass filters, each tuned to a different frequency, $f_0, f_1 \ldots f_E, f_F$. The signal processor determines the amplitude and phase of the signals that pass through these respective filters. These amplitudes and phases contain the code or "signature" of the particular signal transformer of the interrogated transponder. This signature may be analyzed and decoded in known manner.

As can be seen, in this embodiment, all significant components of the third (mixed) signal will be within a limited range defined by the maximum delay within the transponder signal transformer and the chirp rate. Thus, this signal may be band limited within this range without loss of significant information. As stated above, in a known system with a chirp range of 20 MHz, over a cycle period of 16 mS, with 128 transitions, the frequency difference per transition is 156,250 Hz.

In one embodiment of a passive transponder, the internal circuit is a surface acoustic wave device which operates to convert the received first signal into an acoustic wave, and then to reconvert the acoustic energy back into the second signal for transmission via a dipole antenna. The signal transforming element of the transponder includes a piezoelectric substrate material such as a lithium niobate ($LiNbO_3$) crystal, which has a free surface acoustic wave propagation velocity of about 3488 meters/second. The substrate is, for example, a 3 mm by 5 mm rectangular slab having a thickness of 0.5 mm. On the surface of this substrate is deposited a layer of metal, such as aluminum, forming a pattern which includes transducers and delay/reflective elements. Each delay element has a width sufficient to delay the propagation of the surface acoustic wave from one tap transducer to the next by one quarter cycle or 90° with respect to an undelayed wave at the frequency of operation (in the 915 MHz band). By providing locations for three delay pads between successive tap transducers, the phase f of the surface acoustic wave received by a tap transducer may be controlled to provide four phase possibilities, zero pads=0°; one pad=90°; two pads=180°; and three pads=270°. These pads may be selectively deposited as a metallization layer during manufacture, or formed in a complete complement and selectively removed during a secondary process to encode the transponder. Where a reflective element returns the signal to the launch transducer, the delays are calculated based on two passes over the pad. Typically, a reflective or semireflective element is provided between each set of delay pads to allow them to be distinguished, and allowing, in the case of semireflective elements, for a series of sets of delay pads to be disposed along the path of an acoustic wave. As the number of sets of delay pads increases, the signal to noise ratio in the transponder reply signal is severely degraded. This limitation on the number of tap transducers places a limitation on the length of the informational code imparted in the transponder replies.

A plurality of launch transducers may be connected to common bus bars which, in turn, are connected to the dipole antenna of the transponder. Each launch transducer may have a forward and backward wave, and, indeed, care must be taken to damp a reverse wave where this emission is undesired in order to reduce interference. Thus, the codespace of the transponder may include a plurality of sets of encoding elements, each associated with a particular wavepath. Opposite each launch transducer is one or more reflectors, which reflect surface acoustic waves back toward the transducers which launched them. Since the transducers are connected in parallel, a radio frequency interrogation pulse is received by all the transducers essentially simultaneously. Consequently, these transducers simultaneously generate surface acoustic waves which are transmitted outward in both directions. The system is configured so that the reflected surface acoustic waves are received by their respective transducers at staggered intervals, so that a single interrogation pulse produces a series of reply pulses after respective periods of delay.

The embodiment of FIG. 1 comprises a substrate 120 of piezoelectric material, such as lithium niobate, on which is deposited a pattern of metallization essentially as shown. The metallization includes two bus bars 122 and 124 for the transmission of electrical energy to four launch transducers 126, 128, 230 and 232. These launch transducers are staggered, with respect to each other, with their leading edges separated by distances X, Y and Z, respectively, as shown. The distances X and Z are identical; however, the distance Y is larger than X and Z in order to provide temporal separation of the received signals corresponding to the respective signal paths. Further metallization includes four parallel rows of delay pads 134, 136, 138 and 140 and four parallel rows of reflectors 142, 144, 146 and 148. The two rows of reflectors 144 and 146 which are closest to the transducers are called the "front rows" whereas the more distant rows 142 and 148 are called the "back rows" of the transponder. The bus bars 122 and 124 include contact pads 150 and 152, respectively, to which are connected the associated poles 152 and 156 of a dipole antenna. These two poles are connected to the contact pads by contact elements or wires 158 and 160, represented in dashed lines.

The provision of four transducers 126, 128, 130 and 132 and two rows of reflectors 142, 144, 146, and 148 on each side of the transducers results in a total of sixteen SAW pathways of different lengths and, therefore, sixteen "taps". These sixteen pathways (taps) are numbered 0, 1, 2 . . . D, E, F, as indicated by the reference number (letter) associated with the individual reflectors. Thus, pathway 0 extends from transducer 226 to reflector 0 and back again to transducer 126. Pathway 1 extends from transducer 228 to reflector 1 and back again to transducer 128. The spatial difference in length between pathway 0 and pathway 1 is twice the distance X (the offset distance between transducers 126 and 128). This results in a temporal difference of ΔT in the propagation time of surface acoustic waves. Similarly, pathway 2 extends from transducer 126 to reflector 2 and back again to transducer 126. Pathway 3 extends from transducer 128 to reflector 3 and back to transducer 128. The distance X is chosen such that the temporal differences in the length of the pathway 2 with respect to that of pathway 1, and the length of the pathway 3 with respect to that of pathway 2 are also both equal to ΔT. The remaining pathways 4, 5, 6, 7 . . . E, D, F are defined by the distances from the respective transducers launching the surface acoustic waves to the associated reflectors and back again. The distance Y is equal to substantially three times the distance X so that the differences in propagation times between pathway 3 and pathway 4 on one side of the device, and pathway B and pathway C on the opposite side are both equal to ΔT. With one exception, all of the temporal differences, from one pathway to the next successive pathway are equal to the same ΔT. The SAW device is dimensioned so that ΔT nominally equals 100 nanoseconds. In order to avoid the possibility that multiple back and forth propagations along a shorter pathway (one of the pathways on the left side of the SAW device as seen in FIG. 1) appear as a single back and forth propagation along a longer pathway (on the right side of the device), the difference in propagation times along pathways 7 and 8 is made nominally equal to 150 nanoseconds.

SUMMARY AND OBJECTS OF THE INVENTION

According to one embodiment of the present invention, the chirp (successive incrementally varying) interrogation signal of the prior art is replaced by a frequency hopping spread spectrum signal.

According to another embodiment, a frequency hopping interrogation signal is pulse modulated, to have time discontinuities, so that an interrogation signal is substantially not present when a transponder signal is being received. In this case, the transponder response signal also represents a frequency hopping signal, having a bandwidth of about the entire width of the interrogation band, e.g., about 20 MHz, but delayed from the respective interrogation signal.

The present invention also provides a system for analyzing spread spectrum passive transponder signals. The signal analysis compensates for the "out of order" excitation sequence as compared to a chirp waveform. According to another aspect of the present invention, the frequency hopping sequence is demodulated to baseband, and the random excitation order accounted for.

The interrogation signal preferably has a gated 50% duty cycle. The result of this intermittent transmission is the elimination of the near-field reflection of the interrogation signal. In addition, the transmitter is decoupled during receipt of the transponder signal, resulting in improved impedance matching. Further, a direct coupling of the interrogation signal into the received signal is not observed.

Prior frequency hopping spread spectrum interrogation systems have employed continuous signals, which do not afford the present advantages. This is because the continuous frequency hopping spread spectrum technique allows continuous signal acquisition, and thus potentially faster readings from a transponder tag.

The preferred intermittent sequence includes a transmit interrogation pulse of 7.5 μS, followed by a gap of about 300 nS, followed by a listening period of 4 μS. Thereafter, for about 3.5 μS, there is no system activity.

The present invention also provides a wide bandwidth detector, which detects the phase transitions of the signal resulting from mixing the received signal with a local oscillator signal. In this case, it is easier to recover from noise in the filter or from a "bad hop", which could saturate the detector for a relatively long period.

Prior art detector circuits, for a 915 MHz band system with 128 evenly spaced hops of duration 125 $\mu$S, and exciting a transponder having a maximum internal delay of less than 10 $\mu$S, have a bandwidth of about 3 kHz, with a frequency transition rate (hop rate) of 8 kHz. 3 kHz is above the maximum significant frequency expected in the mixed signal representing the instantaneous transmitted and return signal with a chirp waveform interrogation signal under these conditions.

According to the present invention, a detector having a bandwidth of about 150 kHz is employed, in a system having a frequency hopping rate of about 66 kHz (hop period of about 15 $\mu$S). This wide bandwidth detector provides fast recovery, low inter-symbol interference, and allows increased sample rates over prior methods.

Accordingly, it is seen that, in prior art systems, the bandwidth of the detector was lower than the frequency hopping rate, while according to this aspect of the present invention, the bandwidth of the detector is greater than the frequency hopping rate. This system provides greater immunity from interference from continuous wave interference sources than prior systems. In other words, whereas prior systems would lose, for example, data from about 30–50 frequency bins due to a continuous wave interference source, the wideband detector system would lose only 1 or 2, a significant improvement.

Prior chirp based systems were also sensitive to the Doppler effect, such that a relative speed of about 50 mph would result in a bin shift and potentially erroneous data. A preferred embodiment of the present invention provides a frequency hopping spread spectrum interrogation system which degenerates the Doppler effect by providing a "V chirp", effectively a non-asymmetric frequency pattern, having an effective df/dt≈0, which cancels the Doppler shift effect and reduces these types of errors.

As a result of the wide bandwidth detector, the signal coming into the analog-to-digital converter is not narrow band limited, and thus the processing system must also accept a wideband signal. This also differs from prior practice, wherein, the significant analog signal was, for example, presumed to be limited to a bandwidth of about 3 kHz. Therefore, in prior systems, with a narrow band low pass filter placed in the analog signal processing path, an analog to digital converter appropriate for this band-limited signal was employed, e.g., a 10 ksps converter for a 3 kHz band-limited signal. According to the present invention, a high speed analog-to-digital converter is employed, for example one capable of sampling the detected signal above its Nyquist rate, for example capable of accepting a signal having a 150 kHz bandwidth; for example a 300–500 ksps converter, preferably with track and hold circuitry. Appropriate antialiasing circuits are employed for the converter sample rate and desired bandwidth.

This wide bandwidth digitized signal thus presents a substantial amount of data to be analyzed. However, because a digital signal processing system is provided, an early data decimation scheme may be implemented, as can an adaptive algorithm and/or non-linear filtering to "clean up" the signal before extraction of the significant data. For example, in the case of radio frequency interference from a fixed narrow band source, data samples corrupted by such interference can be eliminated, or even particularly analyzed in light of the interference, without disrupting data acquisition from other frequency channels. As used herein, a "channel" refers to a particular nominal frequency within the band of the interrogation signal. Typically, it is not necessary to analyze data from each frequency bin to obtain a valid identification, as an excess of frequency bins may be provided; however the availability of such analytic capability potentially improves the robustness of the system and facilitates the use of multiple unsynchronized interrogation systems in close proximity.

It is noted that, according to known systems, this band-limiting filter (detector) acted as an integrator for detecting the phase-amplitude response; the result of the modification of a given frequency excitation of the transponder tag is a received signal having a characteristic shift in phase and change in amplitude, which was seen, for example, as a beat frequency pattern in the return signal. While the phase shift and amplitude attenuation occurs in discrete portions, various known systems seek only to read the net changes between the initial return signal from the transponder and the maximally delayed signal, after all internal elements were accounted for. Thus, it was desired to filter the signal to eliminate transients and increase signal to noise ratio by providing a long time-constant integration (time-averaging) of the signal. Further, since the signal to be analyzed was a mixed signal, a low pass filter also served as an image reject filter.

In contrast, while the system according to the present invention may also seek to determine the net phase and amplitude shift, the filter is not used, for example, to eliminate transients in the response signal. This function is deferred to the digital signal processing chain.

The actual bandwidth of the receiver circuitry preferably is greater than the frequency hop rate in a spread spectrum or staircase increment frequency embodiment. Thus, with frequency changes every 15 $\mu$S, the preferred filter has a minimum bandwidth of about 50–60 kHz. Of course, as the bandwidth of the filter is narrowed, the advantages of the invention decrease, and likewise, the performance improves as the bandwidth gets to be large as compared to the frequency hop rate or change rate.

It is noted that the frequency change rate is established so that the returning signal from transponder tag differs from a simultaneously transmitted interrogation signal. In a pulse modulated embodiment, it is sufficient if the simultaneously transmitted interrogation signal is zero Hertz or turned off. This allows improved impedance matching in the receiver and reduced leakage from a simultaneously transmitted signal. The return signal timing is, in turn, based on the inherent delay in the transponder tag and the time of flight travel through the atmosphere. Due to the relatively slow propagation of the signal as an acoustic wave through the transponder tag substrate, this time delay predominates. Thus, the frequency hop rate is normally set with a longer time constant than the maximum significant delay within the transponder tag with a reasonable margin. For example, if the transponder has a maximum delay period of less than 10 $\mu$S, then the frequency hop rate may be about 100 kilohops per second. Practically, the interrogation system operates at a slower rate, for example 15 $\mu$S per hop. Therefore, in this case, the band-limiting filter will preferably have a minimum cutoff of 66–100 kHz, depending on the particular interrogation system operational parameters. Practically, a cutoff of 100–500 kHz is sufficient for achieving the benefits of the invention with a 15 $\mu$S frequency hop rate, with the preferred filter being 150 kHz under these interrogation parameters. Restated, the minimum preferred ratio of cutoff frequency to hop frequency is 1, with benefits significantly diminishing below 0.5, while a ratio of 1.8 to 8 is typically sufficient. Related to the reciprocal of the transponder delay, the preferred minimum cutoff is 0.66, with a preferred range of 1.2–5.

It is noted that the received signal from the transponder tag has transient signal components which have a minimum timing of 100 nS. Typically, the preferred interrogation system does not attempt to directly read or interpret these transients, which would require, for example, a 20 MHz or higher receiving system bandwidth, employing, for example, a 20–50 MSPS analog to digital converter and producing a very large amount of raw data. However, such a sampling and analysis technique is possible, for example, employing systems similar to radar target analyzers.

The frequency hopping interrogation signal is generated by a digitally controlled oscillator to produce a pseudorandom pattern of frequencies. The digitally controlled oscillator is preferably a voltage controlled oscillator with a digital control input. The duration of each hop is longer than the longest delay in a transponder as well as the travel delay. The duration of the interval between hops is also longer than the longest delay in a transponder as well as the travel delay. In determining the transponder tag code, the transponder is excited by at least the same number of differing hops as there are delay taps (degrees of freedom), and preferably are a larger number. For example, with 16 delay taps, there are at least 16 excitation frequencies, and more preferably 128 frequencies, which allows improved robustness of operation. This robustness provides immunity to random noise, fixed frequency interference sources and adjacent interrogation systems. Advantageously, the pseudorandom sequence of the entire sequence of frequencies includes suitable subsets of excitation frequencies, allowing preliminary processing to determine transponder tag code to commence prior to completion of an entire sequence. If the code is reliably read, the interrogation sequence may be truncated, for example to reduce power consumption in a portable embodiment or to reduce the possibility of adjacent channel interference where multiple interrogation systems are in close proximity. In this case, the interrogation cycle may be discontinuous. The pseudorandom sequence may repeat after each set, or have extended pseudorandom properties.

The properties of the interrogation transmitter preferably spread the power of the interrogation wave relatively evenly across the band over time, to reduce interference with neighboring devices, and to potentially avoid functional interference from neighboring devices, which may be other interrogation systems, or other radio frequency sensitive devices. Thus, since the pseudorandom sequence includes a set of excitation frequencies larger than is needed, interference on one or more particular excitation frequencies may be tolerated. Government regulatory agencies, such as the U.S. Federal Communications Commission (FCC) provide rules, regulations or guidelines as to what types of frequency hopping emissions are acceptable, and the system is capable of operating within the requirements presently established. The present system, therefore, accommodates the various permissible schemes, and may be modified according to the teachings herein to accommodate newly proposed or required radio frequency emission characteristics.

Since the acoustic wave transponder device is passive, the order of excitation frequencies is accounted for in the analysis, to analyze a received signal based on the corresponding excitation frequency. Since the signals are linearly additive and the filters may be highly selective, multiple frequency channels may be present simultaneously, although a multichannel decoder (or multiple repetitions of a channel sequence) would be required to analyze the signal. Known acoustic wave transponder devices may be used with the system according to the present invention, as the interrogation and signal analysis scheme are tolerant of various transponder designs.

In a preferred embodiment, the interrogation signal is pulsatile, having, for example, between 25%–50% duty cycle, and therefore represents a substantially discontinuous waveform. The prior art low bandwidth filter/integrator would not appropriately settle under such circumstances. However, according to the present invention, the filter/integrator has a short time constant relative to the frequency hopping rate, and therefore a usable output is produced. For example, with a frequency hopping period of 15 $\mu$S, the system generates an interrogation pulse at a selected frequency for 7.5 $\mu$S, is silent and insensitive for 300 nS to eliminate near-field echos, and then listens for 4 $\mu$S for the return signal. The system is then silent and insensitive for the remaining portion of the cycle, about 3.5 $\mu$S.

The receiver mixes the interrogation signal, or a representation thereof, e.g., a delayed representation, with the received transponder signal, which results in a signal modulated around baseband, with a series of transients representing the taps of the transponder tag. The net phase shift and amplitude change after these transients settle represents the significant data from the tag, the superposition of each signal path. By measuring this superposed response for multiple frequencies, the individual signal modification elements may be decoded.

Since the transponder signal is demodulated to baseband, the signal from the homodyne demodulator includes a near-D.C. component as well as bursts of high frequency energy corresponding to the transients produced by the delay taps, after each frequency hop. According to prior methods, the demodulator output is low pass filtered, for example less than about 10 kHz, e.g., 3 kHz, to filter the bursts and high frequency components from the low frequency components representing the significant data.

In a homodyne embodiment, this low pass detector filter thus acts as an integrator, whose output represents a near-D.C. voltage due to the phase amplitude response, at a given excitation frequency, to a particular set of encoding elements of a transponder, i.e., phase shift elements and attenuation elements. Since, in the preferred embodiment, the attenuation elements are frequency independent, the normalized near-D.C. voltage signal will vary in proportion to the net phase shift from all of the signal modification elements, over short periods. Even where the mixed signal is somewhat displaced from 0 Hz, such as due to a Doppler effect, the detected output may be analyzed to determine the delays within the transponder.

This change in amplitude is determined for every frequency hop, for example every 125 $\mu$S for an 8 kilohop per second embodiment, and every 15 $\mu$S for a 66 kilohop per second embodiment. Because of the differences in the transponder signal with respect to changes in interrogation frequency, due to the fixed time delay per phase delay pad, the composite phase for each frequency hop provides a datapoint for analyzing the various individual component delays within the transponder. For a transponder with 16 potential delays, the response must be measured for at least 16 frequencies, in order to resolve the individual delays. In practice, at least 32 frequencies, and more preferably 128 frequencies are employed. Since a minimum of 16 measurements must be made to analyze the simultaneous equations representing the delay element group arrangement of the transponder, processing may commence with partial data. However, a minimum set of measurements may yield unreliable data, so a larger set is preferably employed. If the analyzer seeks to logically reorder the received signal data into a chirp (linearly increasing frequency) waveform, then the analysis must wait until the data is available for reordering.

The thus obtained sets of amplitudes at each interrogation frequency contain the code or "signature" of the particular signal transformer of the interrogated transponder. This signature may be analyzed and decoded using simultaneous equation solving techniques in known manner. Of course, it is understood that the analyzed signals may be more complex than D.C. voltages, and therefore the associated processing and analysis somewhat more sophisticated. However, in principal, the characterization of the plurality of signals under differing excitation conditions is employed in analogous fashion to resolve the encoded identification of the transponder.

In performing an analysis of the transponder signal, a number of compensations and corrections may be made. For example, the round trip signal delay may be normalized, yielding an estimate of distance by a time of arrival technique. Likewise, any Doppler shift in the signal may be determined and compensated, additionally allowing an indication of relative speed. These corrections may be implemented by altering the baseband demodulation to compensate, or by predistorting the interrogation wave as desired. These corrections, and others, may also be provided in a digital processing algorithm in the analyzer.

As noted above, there are a number of potential causes for variations from the nominal delay periods of a transponder, including temperature changes, mask variations, manufacturing variations and random variations. Prior art chirp interrogation systems, which employed frequency domain transformations, thus compensated for these factors by adjusting the boundaries of frequency bins. According to the present invention, these compensations are made in evaluating the simultaneous equations which represent the individual delays based on the sets of received amplitudes of the demodulate signals. Since these techniques are closely corresponding, the known techniques may be generally applied to the delay data produced by the present invention. Thus, the actual individual delays are determined based on the sets of equations, and then interpreted based on the compensation factors.

It is therefore an object of the present invention to provide a method for analyzing a frequency hopping spread spectrum interrogated passive acoustic transponder comprising the steps of receiving a transponder signal, demodulating the transponder signal with a representation of the interrogation signal, integrating the demodulated transponder signal from a frequency hop with an effective integration time constant smaller than a duration of the frequency hop, determining a relative phase-amplitude response of the demodulated signal due to interrogation signal perturbations within the transponder, based on the integrated demodulated transponder signal, over a plurality of frequency hops, and analyzing the determined phase-amplitude, response to determine a set of component delays within the transponder.

It is also an object of the present invention to provide a method for analyzing a frequency hopping spread spectrum interrogated passive acoustic transponder comprising the steps of exciting a transponder with a spread spectrum interrogation signal in a plurality of differing excitation states, receiving modified signals from the transponder under the plurality of differing excitation states, demodulating the received signals, filtering the demodulated received signals with a wide bandwidth filter, determining a characteristic perturbation of the demodulated received signals for each excitation state, and analyzing the determined characteristic perturbations to determine a set of component perturbation elements within the transponder.

It is a further object of the present invention to provide a method for interrogating a passive acoustic transponder with a non-narrow band frequency interrogation signal having a plurality of differing excitation states, receiving modified signals from the transponder under the plurality of differing excitation states, demodulating the received signals, filtering the demodulated received signals with a wide bandwidth filter, having a time constant which is small with respect to the period between transitions of excitation states, determining a characteristic perturbation of the demodulated received signals for each excitation state, and analyzing the determined characteristic perturbations to determine a set of component perturbation elements within the transponder.

It is also an object according to the present invention to provide a passive radio frequency transponder system which employs an intermittent interrogation signal.

It is a further object according to the present invention to provide a passive radio frequency transponder system for reading information encoded into a passive device as a set of time-constants, comprising exciting the passive device with a set of signals having differing frequency components, receiving a modified set of signals from the passive device with perturbations due to the time-constants, and filtering the received signals with a filter having a time constant comparable in magnitude to a maximum time constant of the passive device.

It is also an object of the invention to analyze a set of steady state responses, at differing frequencies, of an acoustic transponder.

It is a further object according to the present invention to provide a passive acoustic transponder interrogation system capable of compatibly operating with known tap-delay acoustic transponder devices, while operating with a spread spectrum interrogation signal, e.g., as permissible under FCC regulations. The present invention also gains the known advantages of spread spectrum communications systems.

It is another object of the invention to provide a system and method for interrogating a passive acoustic transponder, producing a transponder signal having characteristic set of signal perturbations in response to an interrogation signal, comprising a signal generator, producing an interrogation signal having a plurality of differing frequencies; a receiver, for receiving the transponder signal; a mixer, for mixing the transponder signal with a signal corresponding to the interrogation signal, to produce a mixed output; an integrator, integrating the mixed output to define an integrated phase-amplitude response of the received transponder signal; and an analyzer, receiving a plurality of integrated phase-amplitude responses corresponding to the plurality of differing frequencies, for determining the characteristic set of signal perturbations of the passive acoustic transponder.

It is also an object of the invention to provide an apparatus and method for identifying a passive acoustic transponder or an object associated therewith, comprising placing a passive acoustic transponder in proximity to the object, the transponder having a set of characteristic signal perturbations selected from a signal perturbation space having a plurality of degrees of freedom, and producing a perturbed signal in response to an interrogation; interrogating the passive acoustic transponder with a frequency hopping spread spectrum signal, having a sequence of a plurality of different frequencies, and a dwell period; receiving and demodulating the perturbed signal based on a representation of the frequency hopping spread spectrum signal; determining an average phase-amplitude response of the demodulated perturbed signal during a plurality of dwell periods; and analyzing the average phase-amplitude response from the plurality of dwell periods to determine the values of the plurality of degrees of freedom. In this case, preferably, a plurality of passive acoustic transponders are provided, with a database storing an association of each passive acoustic transponder with values identifying the values of the plurality of degrees of freedom and the identity of the associated object, with the identity of the transponder or object retrieved from the database based on the determined values of the plurality of degrees of freedom.

The characteristic set of signal perturbations may include an acoustic reflection pattern, a set of phase shifts, resonances, and/or amplitude attenuation.

The interrogation signal preferably has a frequency band having a bandwidth of less than about 5% and having a center frequency in the range of between about 300 MHz to about 30 GHz, and more preferably a frequency in a band between about 800 MHz and 1.3 GHz and having a bandwidth of between about 1–3%. The interrogation signal may be, for example, a frequency hopping spread spectrum signal, but may also have a stepwise chirp or other waveform. Thus, the sequence of frequency hops may be random, pseudorandom (repeating sequence), or regular. The interrogation signal may produce the plurality of differing frequencies individually, or a plurality of frequencies concurrently. In the latter case, typically a multiplexer or parallel processing path (a plurality of mixers) would be necessary, each mixing a different frequency component to produce a demodulated signal.

The characteristic set of signal perturbations includes a pattern selected from a signal perturbation space having one or more degrees of freedom. Where the degrees of freedom include composite delays, these may be distinguished by providing an interrogation signal or set of signals including a plurality of differing frequencies no less in number than the number of degrees of freedom. There preferably are at least two times the number of differing frequencies as there are degrees of freedom, and, for example, 8 to 16 times the number of differing frequencies in a set of discrete frequencies is a suitable range. The differing frequencies are preferably spread about evenly across a band, although the selection of frequencies may be optimized to distinguish each degree of freedom, which may result in non-even spreading. Unevenly spaced interrogation frequency embodiments may also be employed as known in the art. The interrogation signal frequencies are preferably generated with a digitally controlled oscillator. In order to better correlate the interrogation signal with the transponder signal, the representation of the interrogation signal fed to the mixer may be delayed with respect to the interrogation signal.

The demodulator may also employ an independently generated signal. Therefore, if a phase shift or delay function between one portion and another portion of the received signal includes the data to be acquired, then, assuming that the analyzer cannot deal directly with the modulated signal, then the mixer therefore must receive a signal from a local oscillator having a stable phase. Preferably, the received signal is demodulated to or near baseband, although this is not required. For example, with a 915 MHz band spread spectrum signal with a bandwidth of 20 MHz, the received signal may be downconverted to a 0–20 MHz band spread spectrum signal and directly digitized, with subsequent processing being digital.

According to a preferred embodiment, the mixer serves as a homodyne phase detector, mixing the transponder signal with a signal corresponding to the interrogation signal to produce, in a steady state condition, a signal whose change in amplitude corresponds to a relative phase difference and attenuation between the transponder signal and the signal corresponding to the interrogation signal. The mixer is preferably a double balanced mixer.

The integrator may be a low pass filter, preferably having at least two poles in its transfer function, but may also be a complex structure, such as an active integrator over a predetermined timeperiod. The integrated phase-amplitude response is preferably represented as a scalar value for each differing frequency of the interrogation signal. As stated above, this integrator preferably has a wide bandwidth.

In one embodiment, the interrogation signal has a plurality of successive states, each state having a predetermined period, the integrator comprising a low pass filter having a main time constant of less than about 100% of the period between successive interrogation signal states. For example, the characteristic set of signal perturbations of the transponder has a maximum significant time constant of less than about 5 $\mu$S and comprises a pattern selected from a signal perturbation space having about 16 degrees of freedom, the transponder integrator interrogation signal being a pseudorandom sequence frequency hopping signal having about 128 successive different frequencies before repetition, each state having a predetermined period of about 15 $\mu$S. In this case, the integrator time-constant is less than about 15 $\mu$S, and more preferably about 8 $\mu$S.

In one embodiment, the interrogation signal comprises a frequency hopping spread spectrum signal having a dwell period, the characteristic set of signal perturbations of the transponder having a maximum significant time constant, e.g., being less than about 50% of the dwell period, the integrator being a low pass filter having a reciprocal of cutoff frequency of between about the maximum significant time constant of the transponder and the dwell period.

The transfer function of the integrator may be functionally described as follows. The filter should settle to a desired degree, from the prior normal excitation condition and preferably even from a prior saturated input, before the first significant delayed signal returns from the transponder, and should accurately pass the relative phase delay between the transponder signal prior to the first significant encoding delay and subsequent to the last significant encoding delay. Too long an integration time will allow a form of intersymbol interference, and too short a time constant will be ineffective for antialiasing the signal for digitization and otherwise allow excess noise into the analyzer.

The analyzer preferably evaluates a set of simultaneous equations relating the integrated phase-amplitude responses to the characteristic set of signal perturbations of the passive acoustic transponder. The characteristic set of signal perturbations comprises a pattern selected from a signal perturbation space having a plurality of degrees of freedom, the interrogation signal having a number of the plurality of differing frequencies no less than the number of degrees of freedom, the analyzer solving simultaneous equations for evaluating the degrees of freedom, the analyzer compensating the evaluated degrees of freedom for predetermined variances, evaluating each integrated phase-amplitude response for consistency with a set of remaining integrated phase-amplitude responses, and outputting a compensated, self-consistent data set corresponding to the evaluated degrees of freedom.

These and other objects will become apparent from a review of the detailed description of the preferred embodiments.

BRIEF DESCRIPTION OF THE DRAWINGS

FIGS. 7A1, 7A2 and 7B are a schematic drawings of a single pole R-C integrator, a double pole R-C integrator and a switched integrator.

DETAILED DESCRIPTION OF THE PREFERRED EMBODIMENTS

Figure 1:
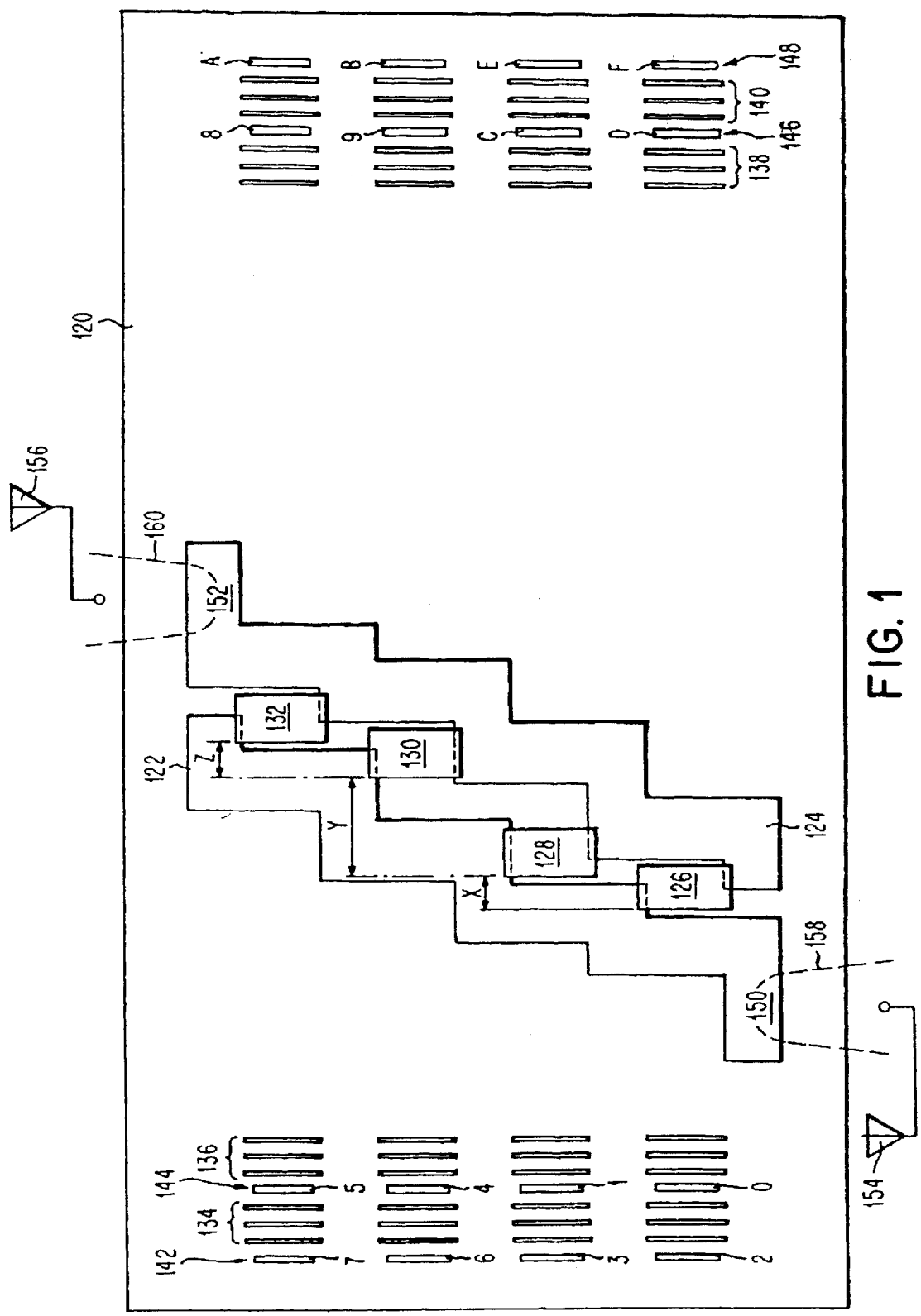
FIG. 1 is a plan view, in enlarged scale, of a transponder configuration.

The preferred embodiments of the present invention will now be described with reference to the drawings. Identical elements in the various figures are designated with the same reference numerals.

An interrogation system according to the present invention is provided which employs a frequency hopping spread spectrum signal having a pseudorandom sequence which excites a set of frequencies. Typically, the interrogation sequence is repeated continuously. The interrogation signal occupies, for example, a band of approximately 20 MHz centered at 915 MHz. The band is divided into 128 discrete frequencies, each of occupies a period of about 15 $\mu$S. For example, with a frequency hopping period of 15 $\mu$S, the system generates an interrogation pulse at a selected frequency for 7.5 $\mu$S, is silent and insensitive for 300 nS to eliminate near-field echos, and then listens for 4 $\mu$S for the return signal. The system is then silent and insensitive for the remaining portion of the cycle, about 3.5 $\mu$S.

The interrogation signal is generated by a digitally controlled oscillator, including a phase locked loop with voltage controlled amplifier. The sequence is generated by a sequence generator which sets the digital controls of the digitally controlled oscillator to a desired state and with a desired sequence. One possible scheme is to evenly spread energy through the band, without concentrating the wave energy in a narrow range for an extended period, with a repeated pseudorandom sequence of 128 different frequencies. The sequence generator may include a lookup table or algorithmic pseudorandom sequence generator. A typical passive transponder device for use with the system has 16 degrees of freedom in its code space, generated by four bidirectional transducers, each wave having two sets of delay pad elements. Thus, the interrogator system analyzer must resolve the 16 degrees of freedom in order to identify the encoding of the transponder. In order to resolve these degrees of freedom, at least 16 distinct excitation conditions must be applied to the transponder, producing a response which, when analyzed, allows solution of the simultaneous equations. Since at least 16 conditions, in this case different frequencies, are required, the larger available number, e.g., 128 frequencies, allows robustness to interference and increased accuracy.

A microprocessor is provided to control the system, and, for example, generates the control signals for the digitally controlled oscillator signal generator and processes the output. It is understood that the various functions may be integrated into common circuits, such as analog application specific integrated circuits (ASICs), digital ASICs, and/or mixed signal ASICs.

Further, since only 16 discrete excitation parameters are required, of the 128 available, the analysis in the analyzer may proceed based on an incomplete data set. Because of thus flexibility, the frequency hopping sequence from the sequence generator need not repeat or excite each frequency at the minimum rate, so long as the analyzer, to be described later, is provided with data identifying the set of excitation conditions, i.e., an information path from the sequence generator. The analyzer ultimately outputs identifying information for the transponder.

The receiver includes an antenna and amplifier, which receives the modified interrogation signal from the transponder. The modified interrogation signal is mixed in a demodulator with a representation of the interrogation signal, which in this case is derived from the oscillator output during the receive period. The demodulator is a double balanced mixer, operating with inputs up to at least 1 GHz. As an alternate to the oscillator signal, the representation of the interrogation signal may a signal delayed by a delay element, or comprise an independently generated signal which is coherent with the interrogation signal. The purpose of this mixer is to translate the frequency of the signal to baseband, but more importantly to allow homodyne detection of the relative phase-amplitude relationship between the interrogation signal and the transponder signal. Where the signals are in phase and of the same frequency, the output of the mixer is maximal, and decreases as the phases reach quadrature, turning negative as the signals move completely out of phase. The amplitude of the received signal will also modify the phase-amplitude response from the mixer. Due to the composite nature of the transponder signal, being the superposition of the modifications in each acoustic path in the transponder device, as each component of the wave is initially received after a frequency hop, the relative phase will change. After the transient response has abated, the relative phase and amplitude will be static until the next hop. If the relative frequencies of the transponder return signal and the interrogation signal are close, for example having a relative phase shift during the integration period of less than 10%, then the error due to this difference will be small. Therefore, in practice, a homodyne signal analysis may be applied in the presence of a small difference in phase between the two signals.

It is noted that, as employed herein, the phrase "phase-amplitude" denotes the complex phase and amplitude characteristics of the signal, and therefore encompasses changes in relative phase, relative amplitude, and/or changes in relative phase and amplitude.

Figure 2:
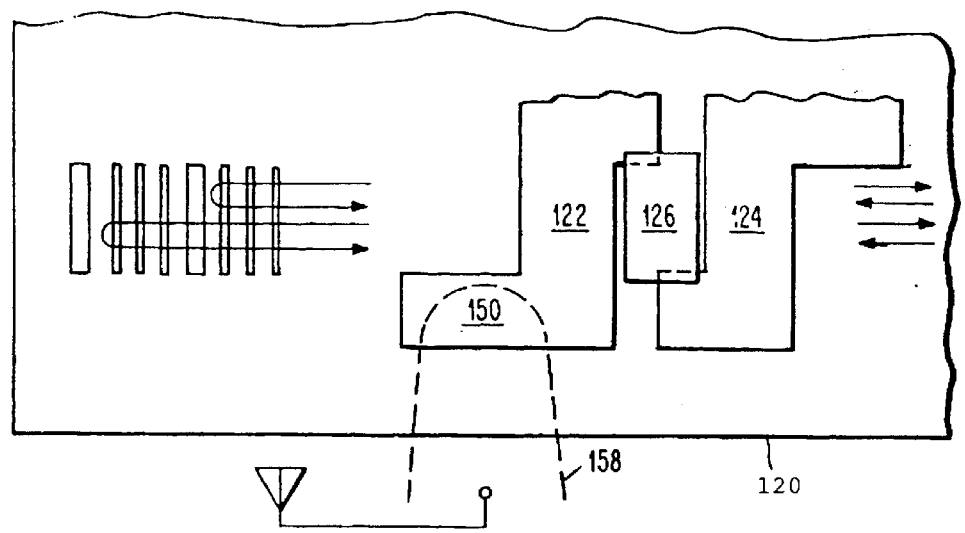
FIG. 2 is a plan view, in greatly enlarged scale, of a portion of the transponder configuration shown in FIG. 1.
Figure 3:
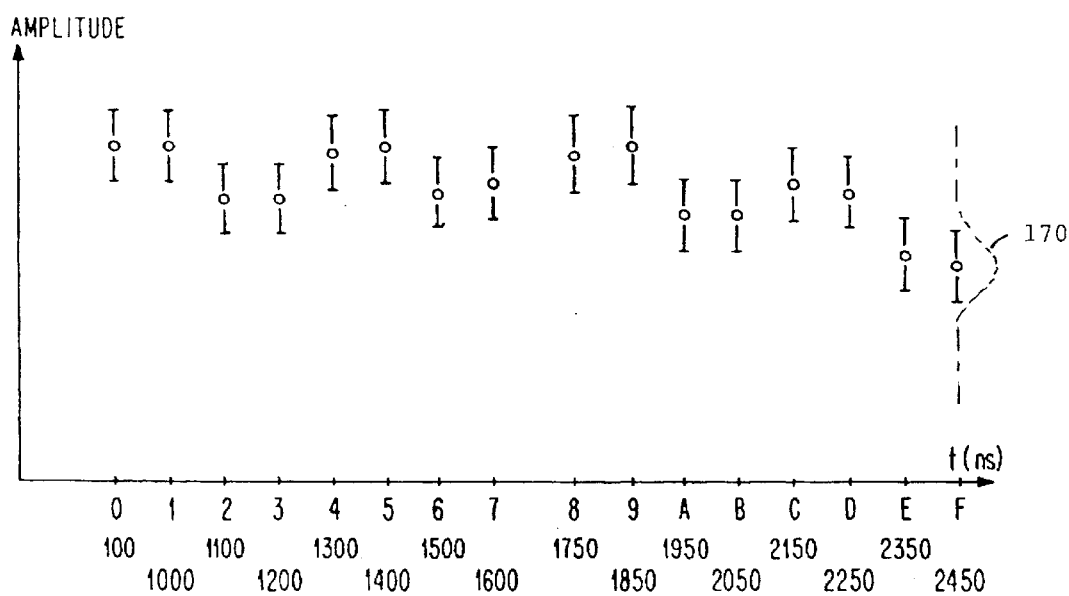
FIG. 3 is a diagram showing the respective time delays of the different SAW pathways in the transponder of FIG. 1.
Figure 4:
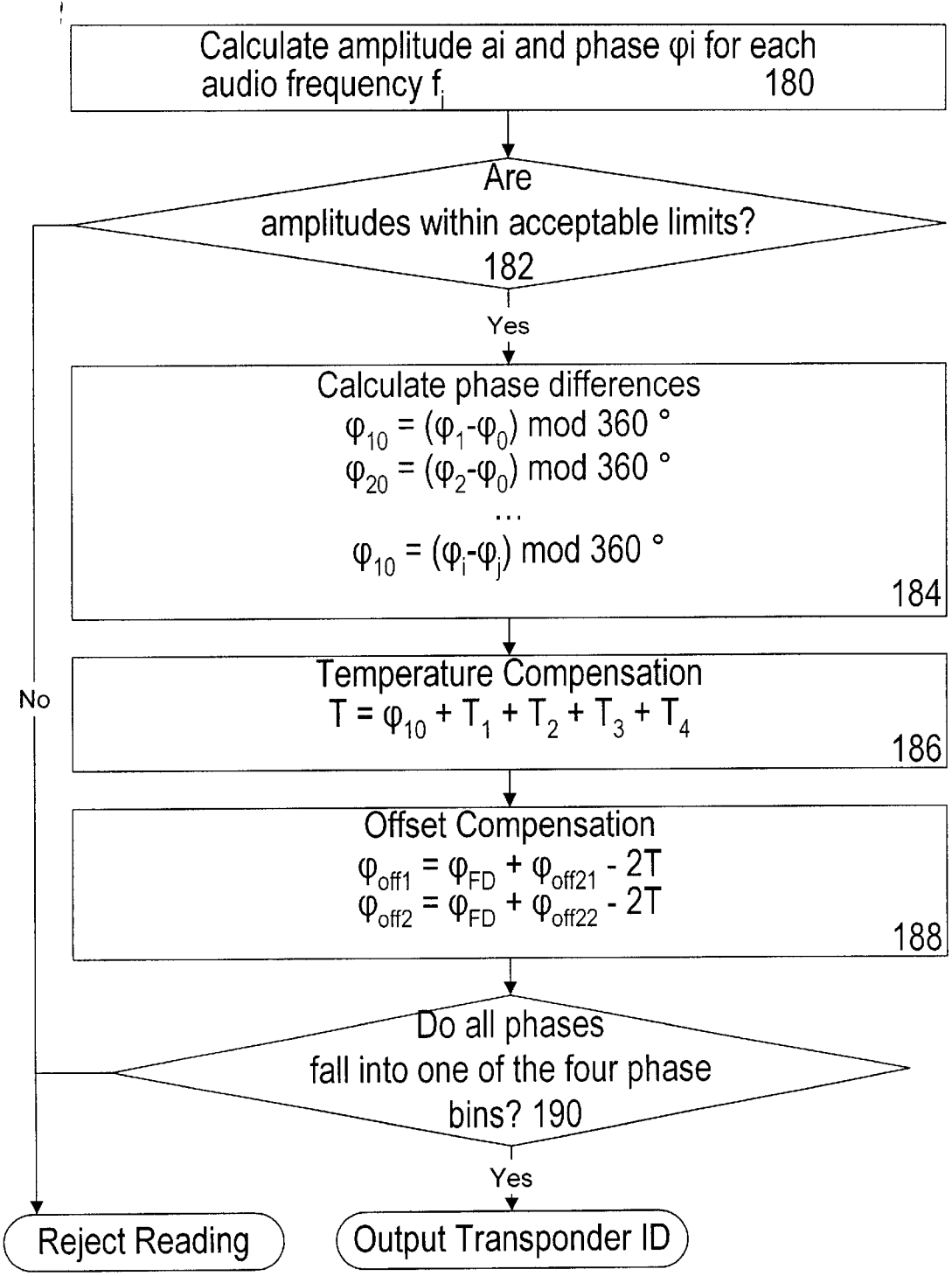
FIG. 4 is a flow diagram showing the order of calculations carried out by the signal processor.

An integrator, which is a two pole R-C low pass filter, as shown in FIG. 19A2, having two time-constants of about b 7μS, and a frequency cutoff of about 150 kHz, receives the output of the mixer, and thus produces a filtered output representing the phase-amplitude response for each excitation frequency. The integrator output is sampled by a sample hold amplifier before and the transients due to the encoded delays within the transponder.

Figure 7B:
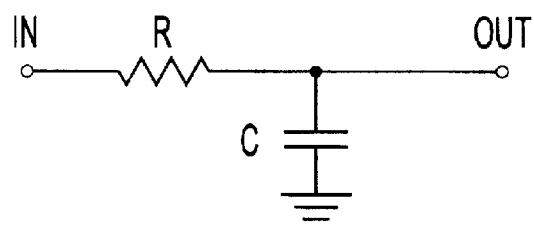
Figure 7B:
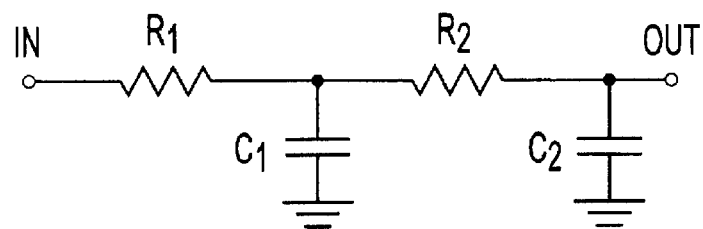
Figure 7B:
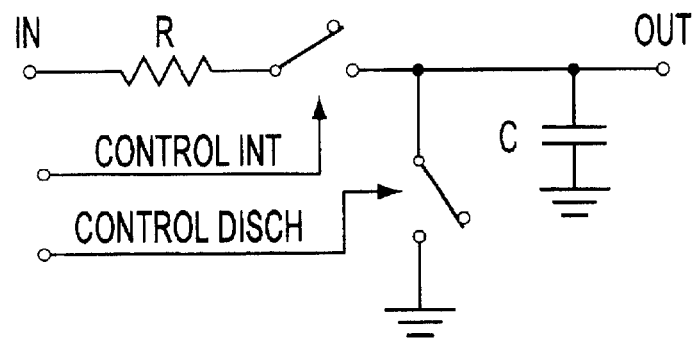
Figure 8:
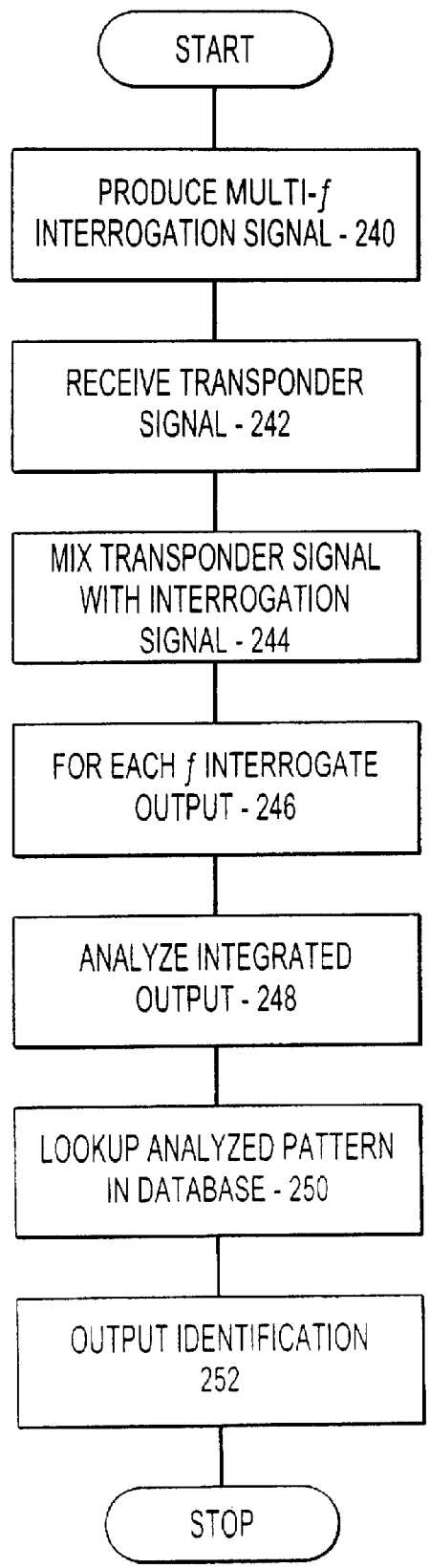
FIG. 8 is a flow chart showing the operation sequence of a system according to the present invention.

Of course, the integrator may be more or less complex. It may be a single pole R-C filter, as shown in FIG. 7A1, an active filter (not shown) or digitally controlled integrator having a controlled integration period, as shown in FIG. 7B, or other type.

The duration of each hop of the signal generator is generally longer than the longest delay in a transponder, as well as the travel delay. Thus, where a maximum delay within a transponder is less than about 10 μS, a stationary frequency dwell period is greater than about 10 μS.

Figure 5:
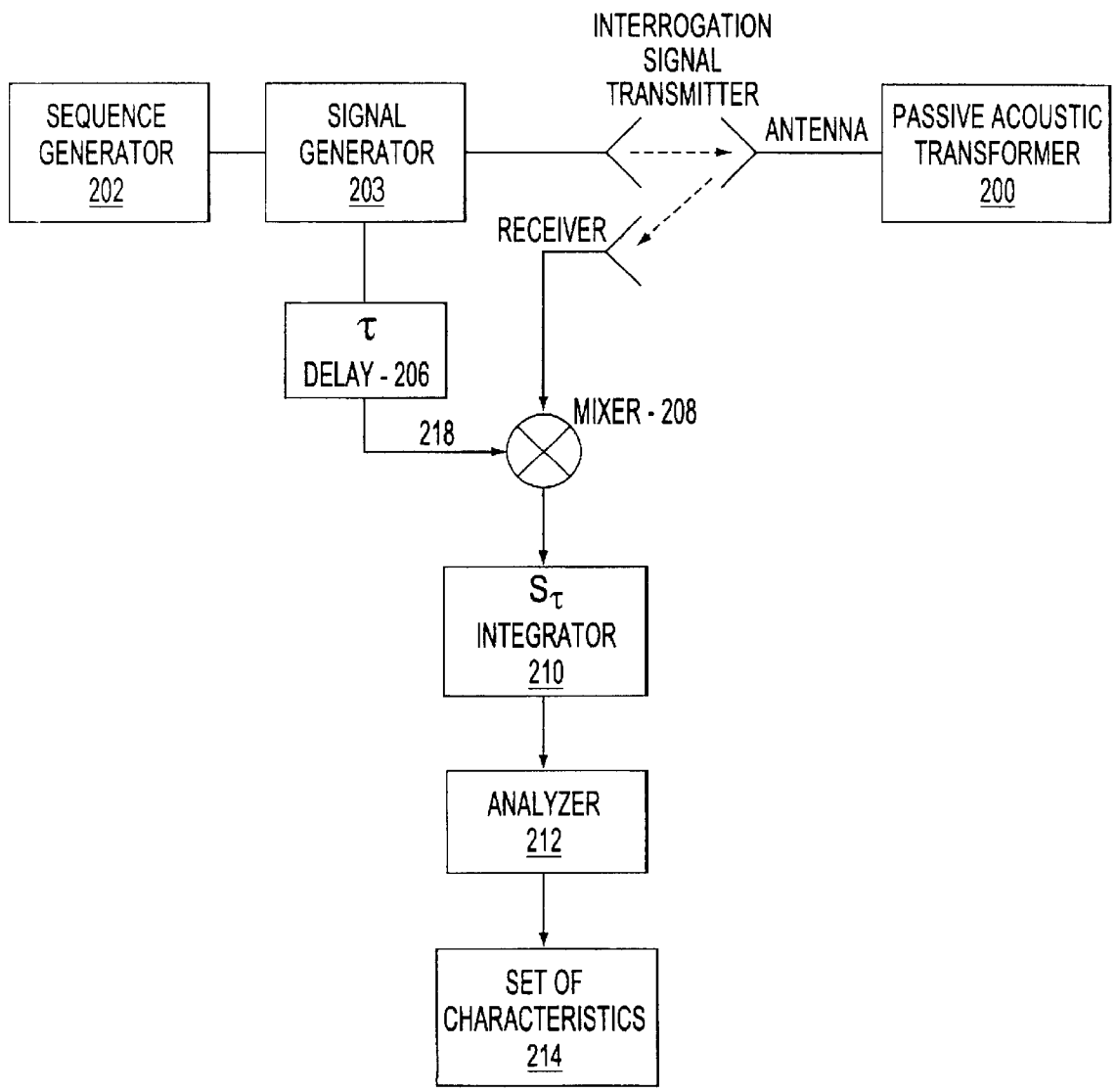
FIG. 5 is a block diagram of a first embodiment of an acoustic transponder interrogation system according to the present invention.
Figure 6:
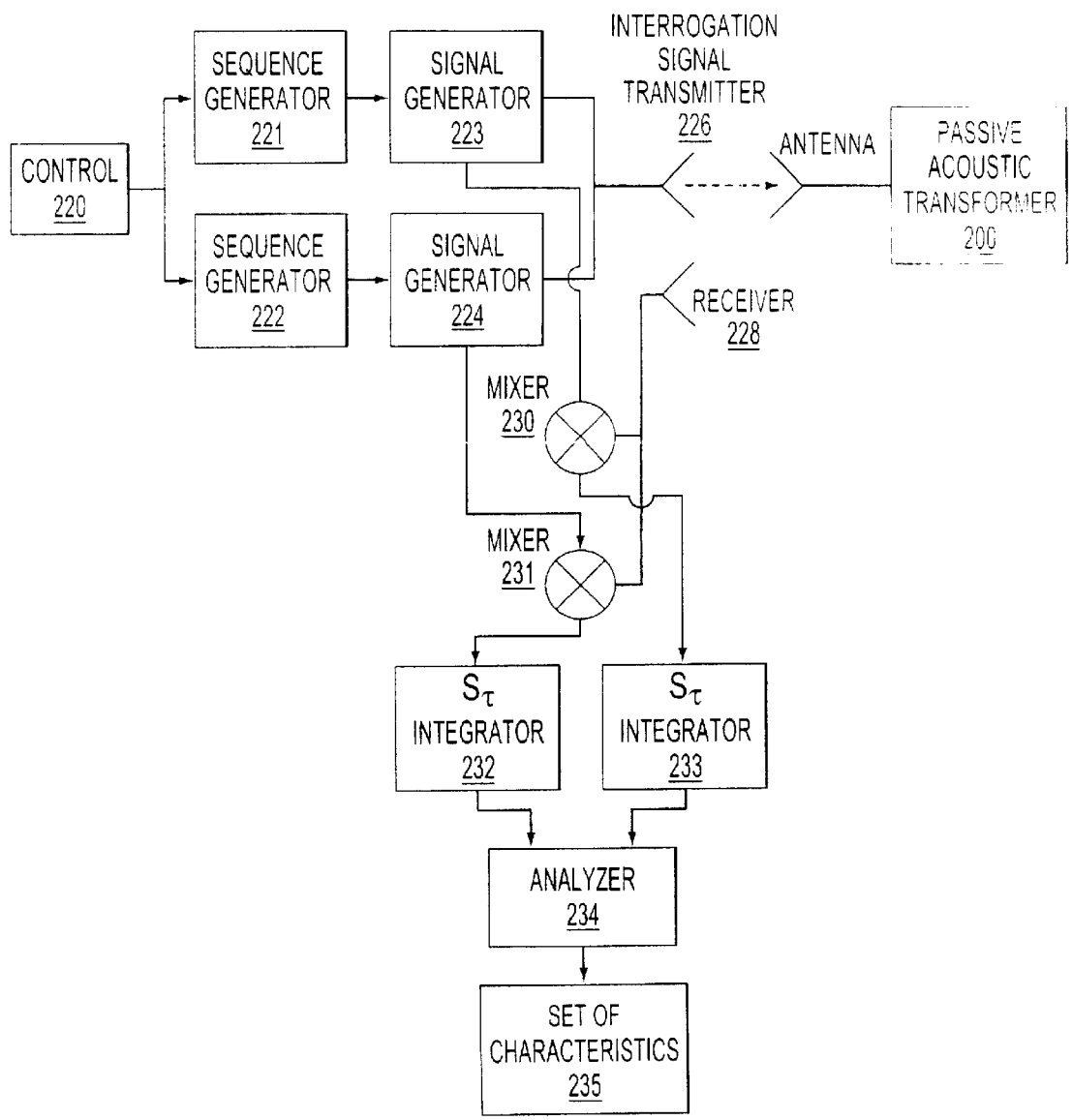
FIG. 6 is a block diagram of a second embodiment of an acoustic transponder interrogation system according to the present invention, having a plurality of signal generators.

In the preferred embodiment, a single frequency is emitted 240 by signal generator 200, based on an input from the sequence generator 202, as the interrogation signal at any time, which is transmitted to a transponder 200, the modified signal from which is then received 242 by the receiver, mixed 244 in mixer 208 with a representation 218 of the interrogation signal, which is, for example, the signal from the signal generator 203, delayed by delay 208, integrated by integrator 210, analyzed 248 in analyzer 212, which outputs a set of characteristics 214; however, a plurality of such frequencies may be emitted simultaneously or concurrently, as shown in FIG. 6. The interrogation process includes producing a plurality of interrogation frequencies 246, the response to each of which is analyzed 248 and subjected to database lookup 250, to determine the identification to be output 252. The receiver system may selectively decode one of the frequencies at any given time, or a parallel process established with a plurality of mixers and integrators. Thus, in the later case, a system as shown in FIG. 6 is provided. A control 220 controls a pair of sequence generators 221, 222 which in turn control a pair of signal generators 223, 224 which are, for example, digitally controlled oscillators. The outputs of the signal generators 223, 224 are summed and emitted from a transmitter 226, and interact with a transponder 200. A receiver, 228 receives a modified interrogation signal, which is then fed to a pair of mixers 230, 231 for demodulation with signals corresponding to the individual signal components of the interrogation signal. The outputs of the mixers 230, 231 are individually integrated in integrators 232, 233 and the outputs captured and analyzed in the analyzer 234. The analyzer 234, after acquiring sufficient data and optionally performing consistency checks, outputs a set of characteristics 235 of the transponder. In comparison to the system shown in FIG. 5, the system according to FIG. 6 will obtain sufficient data for an output about twice as fast. In like manner, a greater number of channels may be simultaneously operative, up to the number of different frequencies.

The demodulator produces a resulting low frequency signal (near baseband), resulting from homodyne demodulation of the interrogation signal with the transponder signal at the same frequency, thus producing a signal with a relative amplitude related to the average complex phase-amplitude relation of the signals entering the mixer. Because of the differences in the transponder signal due the fixed nature of internal delays and the changing interrogation frequency, the relative phase at each frequency hop provides a datapoint for analyzing the various delays within the transponder. The amplitude may also vary in interrogation frequency-dependent manner due to the differences in configuration of each encoded transponder.

In performing an analysis of the transponder signal, a number of compensations and corrections may be made. For example, the round trip signal delay may be normalized, yielding an estimate of distance by a time of arrival technique. Likewise, any Doppler shift in the signal may be determined and compensated, allowing an indication of relative speed. This later correction produces a relative frequency shift of the transponder signal with respect to the interrogation signal. This frequency shift, however, is typically of a relatively low frequency, below the 66 kHz frequency hopping rate and therefore introduces only small errors, which may be compensated in the analysis. Likewise, other potential causes for variations from the nominal delay periods of a transponder, including temperature changes, mask variations, manufacturing variations and random variations may also be compensated in the analysis. Since the determined degrees of freedom correspond to delays, the correction scheme is essentially as shown in FIG. 16 of the prior art.

The relative phase-amplitude output from the integrator is digitized and stored in memory and analyzed under control of the microprocessor, preferably by a dedicated digital signal processor (DSP). This DSP determines the delay coefficients of the transponder, which correspond to the degrees of freedom, and applies corrections and compensations as necessary. The DSP may also perform consistency checking of each data point, based on the redundant information from the larger number of datapoints available than are minimally necessary, excluding from analysis those which are likely to represent artifacts or interference. The microprocessor then receives the delay coefficients, which are used to access a database, allowing identification of the transponder, which is then output. Typically, the database also stores an association with an object, such as baggage, cargo, automobiles, or the like, which may also be accessed from the database.

The analyzer thus evaluates a set of simultaneous equations relating the integrated phase-amplitude responses to the characteristic set of signal perturbations of the passive acoustic transponder, compensating the evaluated degrees of freedom for predetermined variances, evaluating each integrated phase-amplitude response for consistency with a set of remaining integrated phase-amplitude responses, and producing an output of the delay coefficients.

There has thus been shown and described a novel method for interrogating a passive acoustic wave transponder with a frequency hopping interrogation wave, and a method and system for analyzing a transponder signal therefrom. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A system for interrogating a passive acoustic transponder, producing a transponder signal having characteristic set of signal perturbations in response to an interrogation signal, comprising:

(a) a signal generator, producing an interrogation signal having a plurality of differing frequencies;

(b) a receiver, for receiving the transponder signal;
(c) a mixer, for mixing said transponder signal with a signal corresponding to said interrogation signal, to produce a mixed output;
(d) an integrator, integrating said mixed output to define an integrated phase-amplitude response of the received transponder signal for each of said differing frequencies; and
(e) an analyzer, receiving a plurality of integrated phase-amplitude responses corresponding to said plurality of differing frequencies, for determining the characteristic set of signal perturbations of the passive acoustic transponder.

2. The system according to claim 1, wherein the characteristic set of signal perturbations comprises an acoustic reflection pattern.

3. The system according to claim 1, wherein the characteristic set of signal perturbations comprises a set of phase shifts.

4. The system according to claim 1, wherein said interrogation signal comprises a frequency band having a bandwidth of less than about 5% and having a center frequency in the range of between about 300 MHz to about 30 GHz.

5. The system according to claim 1, wherein said interrogation signal comprises a frequency in a band between about 800 MHz and 1.3 GHz and having a bandwidth of between about 1–3%.

6. The system according to claim 1, wherein said interrogation signal comprises a frequency hopping spread spectrum signal.

7. The system according to claim 1, wherein the characteristic set of signal perturbations comprises a pattern selected from a signal perturbation space having a plurality of degrees of freedom, said interrogation signal having a number of said plurality of differing frequencies no less than the number of degrees of freedom.

8. The system according to claim 1, wherein said plurality of differing frequencies are generated sequentially.

9. The system according to claim 1, wherein at least two of said plurality of differing frequencies are generated simultaneously.

10. The system according to claim 1, wherein said interrogation signal has a pseudorandom sequence of differing frequencies which repeats after a finite duration.

11. The system according to claim 1, wherein the characteristic set of signal perturbations comprises a pattern selected from a signal perturbation space having a plurality of degrees of freedom, said interrogation signal having a number of said plurality of differing frequencies between about 2 to 8 times the number of degrees of freedom.

12. The system according to claim 1, wherein the characteristic set of signal perturbations comprises a pattern selected from a signal perturbation space having a plurality of degrees of freedom, said interrogation signal having a number of said plurality of differing frequencies at least 2 times the number of degrees of freedom.

13. The system according to claim 1, wherein said plurality of differing frequencies are about evenly spaced across a band.

14. The system according to claim 1, wherein said signal generator comprises a digitally controlled oscillator.

15. The system according to claim 1, wherein said signal corresponding to said interrogation signal is delayed with respect to said interrogation signal.

16. The system according to claim 1, wherein said mixer homodynes said transponder signal with a signal corresponding to said interrogation signal to produce, in a steady state condition, a signal whose amplitude corresponds to a relative phase-amplitude difference between said transponder signal and said signal corresponding to said interrogation signal.

17. The system according to claim 1, wherein said mixer comprises a double balanced mixer.

18. The system according to claim 1, wherein said integrator comprises a low pass filter.

19. The system according to claim 1, wherein said integrator integrates said mixed output over a predetermined period.

20. The system according to claim 1, wherein said integrated phase-amplitude response is represented as a scalar value.

21. The system according to claim 1, wherein said integrator interrogation signal has a plurality of successive states, each state having a predetermined period, said integrator comprising a low pass filter having a main time constant of less than about 25% of said period.

22. The system according to claim 1, wherein said characteristic set of signal perturbations of said transponder has a maximum significant time constant of less than about 5 $\mu$S and comprises a pattern selected from a signal perturbation space having about 16 degrees of freedom, said transponder integrator interrogation signal being a pseudorandom sequence frequency hopping signal having about 128 successive different frequencies before repetition, each state having a predetermined period of about 125 $\mu$S.

23. The system according to claim 1, wherein said interrogation signal comprises a frequency hopping spread spectrum signal having a dwell period, the characteristic set of signal perturbations of said transponder having a maximum significant time constant of less than about 10% of said dwell period, said integrator being a low pass filter having a cutoff frequency of less than the reciprocal of the maximum significant time constant of the transponder.

24. The system according to claim 1, wherein said integrator comprises a low pass filter having at least two poles in its transfer function.

25. The system according to claim 1, wherein said analyzer evaluates a set of simultaneous equations relating said integrated phase-amplitude responses to the characteristic set of signal perturbations of the passive acoustic transponder.

26. The system according to claim 1, wherein the characteristic set of signal perturbations comprises a pattern selected from a signal perturbation space having a plurality of degrees of freedom, said interrogation signal having a number of said plurality of differing frequencies no less than the number of degrees of freedom, said analyzer solving simultaneous equations for evaluating the degrees of freedom, said analyzer compensating said evaluated degrees of freedom for predetermined variances, evaluating each integrated phase-amplitude response for consistency with a set of remaining integrated phase-amplitude responses, and outputting a compensated, self-consistent data set corresponding to said evaluated degrees of freedom.

27. The system according to claim 26, wherein said interrogation signal is produced intermittently.

28. The system according to claim 1, wherein said signal generator produces said interrogation signal having a plurality of differing frequencies as a substantially complete, pseudorandomly ordered set of frequencies, which are evenly spaced through an interrogation frequency band.

29. A method for interrogating a passive acoustic transponder, producing a transponder signal having characteristic set of signal perturbations in response to an interrogation signal, comprising:

(a) producing an interrogation signal having a plurality of differing frequencies;

(b) receiving the transponder signal from the passive acoustic transponder;

(c) mixing the transponder signal with a signal corresponding to the interrogation signal, to produce a mixed output;

(d) integrating the mixed output to define an integrated phase-amplitude response of the received transponder signal; and (e) analyzing a plurality of integrated phase-amplitude responses corresponding to the plurality of differing frequencies, to determine the characteristic set of signal perturbations of the passive acoustic transponder.

30. A method for identifying a passive acoustic transponder, having a set of characteristic signal perturbations selected from a signal perturbation space having a plurality of degrees of freedom, and producing a perturbed signal in response to an interrogation, comprising the steps of:

(a) interrogating the passive acoustic transponder with a frequency hopping spread spectrum signal, having a psueodorandom sequence of a plurality of different frequencies, and a stationary frequency dwell period;

(b) receiving and demodulating the perturbed signal based on a representation of the frequency hopping spread spectrum signal;

(c) determining an average phase-amplitude response of the demodulated perturbed signal during a plurality of dwell periods; and (d) analyzing the average phase-amplitude response from the plurality of dwell periods to determine the values of the plurality of degrees of freedom.

31. The method according to claim 30, further comprising the steps of:

(e) providing a plurality of passive acoustic transponders;

(f) storing in a database an association of an identification of each passive acoustic transponder with values identifying the values of the plurality of degrees of freedom; and (g) based on the determined values of the plurality of degrees of freedom, retrieving an identification of a passive acoustic transponder from the database.

32. The method according to claim 30, further comprising the steps of providing a plurality of passive acoustic transponders, each physically associated with an object; storing in a database an association of each passive acoustic transponder with the object, including the values identifying the values of the plurality of degrees of freedom; and based on the determined values of the plurality of degrees of freedom, retrieving an identification of an object associated with the transponder from the database.

33. The method according to claim 30, wherein said frequency hopping spread spectrum signal further comprises a quiet period during which no signal is emitted.

34. A system for determining characteristics of an acoustic wave transponder, producing a transponder signal having characteristic set of signal perturbations in response to an interrogation signal and an internal reference, comprising:

(a) an interrogation signal generator, producing a non-stationary interrogation signal hopping to a plurality of differing frequencies;

(b) a receiver, for receiving the transponder signal;

(c) a demodulator, for demodulating a signal dependent on characteristics of the transponder from said interrogation signal, to produce a demodulated output;

(d) a phase-amplitude detector, detecting a phase-amplitude relationship of said demodulated output with respect to the reference; and (e) an analyzer, sequentially receiving a plurality of detected phase-amplitude relationships corresponding to said plurality of differing frequencies, for determining the characteristic set of signal perturbations of the acoustic wave transponder.

35. The system according to claim 34, wherein said non-stationary interrogation signal hops to a plurality of differing frequencies as a substantially complete, pseudo-randomly ordered set of frequencies, which are evenly spaced through an interrogation frequency band.

36. The system according to claim 34, wherein said interrogation signal generator produces an intermittent signal.

37. A method for analyzing a frequency hopping spread spectrum interrogated passive acoustic transponder comprising the steps of:

receiving a transponder signal;

demodulating the transponder signal with a representation of the interrogation signal;

integrating the demodulated transponder signal from a frequency hop with an effective integration time constant smaller than a duration of the respective frequency hop;

determining a relative phase-amplitude shift of the demodulated signal due to interrogation signal perturbations within the transponder, based on the integrated demodulated transponder signal, over a plurality of frequency hops; and analyzing the determined phase-amplitude shifts to determine a set of component delays within the transponder.

38. A method for analyzing a frequency hopping spread spectrum interrogated passive acoustic transponder comprising the steps of:

exciting a transponder with a spread spectrum interrogation signal in a plurality of differing excitation states;

receiving modified signals from the transponder under the plurality of differing excitation states;

demodulating the received signals;

filtering the demodulated received signals with a wide bandwidth filter;

determining a characteristic perturbation of the demodulated received signals for each differing excitation state; and analyzing the determined characteristic perturbations to determine a set of component perturbation elements within the transponder.

39. A method for interrogating a passive acoustic transponder with a non-narrow band frequency interrogation signal having a plurality of differing excitation states, comprising the steps of:

receiving modified signals from the transponder under the plurality of differing excitation states;

demodulating the received signals;

filtering the demodulated received signals with a wide bandwidth filter, having a time constant which is small with respect to the period between transitions of differing excitation states;

determining a characteristic perturbation of the demodulated received signals for each differing excitation state; and analyzing the determined characteristic perturbations to determine a set of component perturbation elements within the transponder.

40. A passive radio frequency transponder method for reading information encoded into a passive device, having a maximum time constant, as a set of phase-amplitude variations of signals having respective variation time constants shorter than said maximum time constant, comprising the steps of:

exciting the passive device with a set of signals having differing frequency components;

receiving a modified set of signals from the passive device with phase-amplitude variations; and filtering the received signals with a filter having a time constant comparable in magnitude to the maximum time constant of the passive device.

41. A passive acoustic transponder interrogation system, comprising:

a transponder, producing a transponder signal having characteristic set of signal perturbations in response to an interrogation signal;

a signal generator, producing an interrogation signal having a plurality of differing frequencies;

a receiver, for receiving the transponder signal;

a mixer, for mixing the transponder signal with a signal corresponding to the interrogation signal, to produce a mixed output;

an integrator, integrating the mixed output to define an integrated phase-amplitude response of the received transponder signal; and an analyzer, receiving a plurality of integrated phase-amplitude responses corresponding to the plurality of differing frequencies, for determining the characteristic set of signal perturbations of the passive acoustic transponder.

42. A method for identifying a passive acoustic transponder or an object associated therewith, comprising:

placing a passive acoustic transponder in proximity to the object, the transponder having a set of characteristic signal perturbations selected from a signal perturbation space having a plurality of degrees of freedom, and producing a perturbed signal in response to an interrogation;

interrogating the passive acoustic transponder with a pseudorandom order, frequency hopping spread spectrum signal, having a sequence of a plurality of different frequencies, and a dwell period;

receiving and demodulating the perturbed signal based on a representation of the pseudorandom order, frequency hopping spread spectrum signal;

determining an average phase-amplitude response of the demodulated perturbed signal during a plurality of dwell periods; and analyzing the average phase-amplitude response from the plurality of dwell periods to determine the values of the plurality of degrees of freedom.

* * * * *